J. B. BENDER.
COMPRESSOR.
APPLICATION FILED SEPT. 12, 1910.
1,019,749.
Patented Mar. 12, 1912.
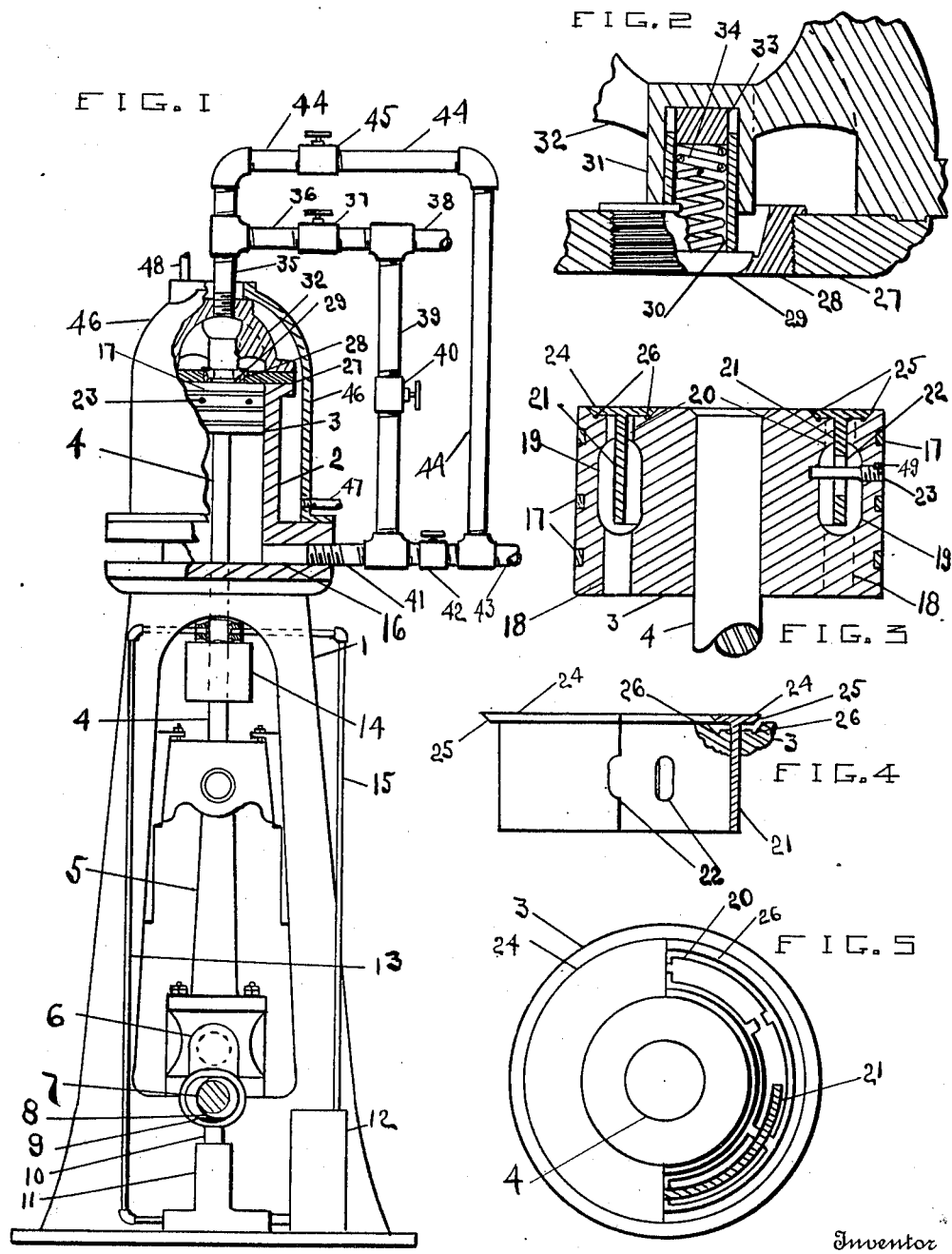

UNITED STATES PATENT OFFICE.

JOHN B. BENDER, OF TOLEDO, OHIO, ASSIGNOR TO CARPER W. NEILSEN, TRUSTEE, OF TOLEDO, OHIO.

COMPRESSOR.

1,019,749.  Specification of Letters Patent. Patented Mar. 12, 1912.

Application filed September 12, 1910. Serial No. 581,520.

*To all whom it may concern:*

Be it known that I, JOHN B. BENDER, a citizen of the United States, residing at Toledo, Lucas county, Ohio, have invented new and useful Compressors, of which the following is a specification.

This invention relates to certain new and useful improvements in compressors.

This invention has utility when embodied in compressors adapted for refrigeration work, possessing marked advantages as to simplicity in construction and efficiency in operation.

Referring to the drawing: Figure 1 is an elevation, with parts broken away of an embodiment of the invention in a compressor; Fig. 2 is a fragmentary view on an enlarged scale of the chambered cylinder head and valve therein; Fig. 3 is a section through the piston, showing the valve therein; Fig. 4 is a fragmentary view of the piston valve in unseated position; and Fig. 5 is an end view of the piston looking toward the outlet side of the piston valve, parts being broken away.

Mounted on the standard 1 is the cylinder 2 having therein the piston 3 carried by piston rod 4 to connecting rod 5 engaging crank arm 6 on the driving shaft 7. This driving shaft 7 for the compressor, is shown as having thereon eccentric 8 operating in oval yoke 9 to reciprocate plunger 10 in the chamber 11 and thereby pump lubricant from reservoir 12 through duct 13 to the piston rod 4 just above the packing gland 14. This forced lubrication circuit is completed by duct 15 leading back to the reservoir 12. The lubricant pump runs only while the compressor is working, and the travel of the piston rod is such as to carry only thin films of oil into the cylinder 2. As this lubricated portion of the rod 4 is adjacent the intake opening 16 to the cylinder, it is exposed to the blast of the incoming gas, which thereby effectually disseminates the oil sufficiently about the cylinder to effectively lubricate, to thus avoid necessity for special cylinder lubrication as well as insure the system against excessive lubrication to interfere with handling of the gas.

The piston is shown as with a grooved periphery to receive the cylinder engaging packing rings 17. On the side of the piston toward intake opening 16, the piston has an annular series of port openings 18 in communication with the annular piston opening 19. Oppositely extending from the openings 18, is a series of openings 20 leading from the opening or chamber 19. Extending through the ports or openings 20 into chamber 19 is the ring valve member 21, shown as having laterally extending flanges seating in the piston end, thereby giving this member a cross-section of T-form. The cross-portions 24 of this T-member, have their terminals inclined toward the stem of the T-member. These inclines 25 seat against corresponding faces of the piston, while at the junction of the flat portion of the piston seat with its inclined seat portions there are grooves 26 which not only serve as air cushion chambers when the valve member seats, but also eliminate battering of corners of the valve member as the seats wear.

The stem portion of the T-member is provided with openings 22 through which extend the pins 23 to limit the unseating travel of the T-member. These pins 23 are retained in position by the small screws 49, coacting with the threaded pins 23 to preclude rotation and thereby working loose.

The end of the cylinder 2 toward which the T-member is movable relatively to the piston 3, is provided with cylinder head 27 having valve seat 28 mounted therein and toward which the valve member 29 is movable. This valve member 29 has integral therewith the hollow or tubular stem 30 coacting to reciprocate in the housing 31 of the chambered discharge head 32 to the cylinder. In this housing 31 and within the stem 30, is the element 33 against which seats the spring 34, serving as a yieldable means to normally urge the valve member 29 into seating position as to the seat member 28.

The valve member 21 moves into the piston 3 to result in a flush piston end, while the opposing cylinder head face comprising the elements 27, 28, 29, also provides a flush face. This combined feature of the valves has unusual merit and works to great economy in the installation, owing to their intercoöperative action in the single action compressor disclosed. The incoming gas below the piston is not compressed therein to raise the temperature at this end, so that the lubrication may be efficient, ample and not excessive, due to blast action of the incoming gas from opening 16 against the lubricant film on the rod 4. Shaft 7 traveling at high speed, unseats the T-member 21 in the downward travel of the piston 3, to allow passage of the gas from below the piston, through openings 18, 19, 20, and past member 21, to the opposite side of the piston 3. As the piston 3 starts upward, member 21 is seated and the gas compressed until its pressure is sufficient to overcome resistance of valve member 29 and the pressure of gas in the chambered head 32. Then the valve member 29 unseats, and the flush features of piston and cylinder head opposing said piston, permit of minimum of clearance to such an extent as to mean a practical elimination of clearance with resulting maximum of capacity and efficiency in expelling all compressed gas. The downward travel of the piston immediately pulls a vacuum above the piston, to unseat the valve member 21, for a new charge of gas to be compressed.

The travel limiting keys or pins for valve member 21 are so locked as to preclude accidental displacement to interfere with the packing rings or attack the cylinder or piston. The housing of spring 34 precludes any accident to spring breakage here, and under normal conditions the pressure of the compressed gas in the chambered head 32 is a factor in seating the valve member 29. Accordingly there is shown herein a simple structure of such fool-proof qualities as to impart thereto great value in small installations for meat market and small refrigeration plants not employing skilled labor to handle.

The compressed gas from chambered head 32 normally passes through pipe 35, pipe 36, valve 37 to pipe 38, to the coolers or cooling coils, under which circumstances the branch pipe 39 has the valve 40 therein closed to prevent communication with pipe 41 connected to the intake opening 16. This pipe 41 normally receives gas coming through valve 42 from line 43, say connected to the cooling tanks. This pipe 43 is connected in the showing herein by branch pipe 44 with pipe 35, the branch 44 having valve 45 therein closed. In the event of accident occurring, making desirable drawing off of gas from line 38, the valves 37, 42, may be closed, valves 45, 40, opened, thus effecting gas travel from line 38, through branch 39, pipe 41 to the compressor, from which it is delivered by pipes 35, 44, into pipe 43.

What is claimed and it is desired to secure by Letters Patent is:

The combination with a compressor comprising a cylinder having an inlet port and a separate outlet port, and means for drawing gas into the cylinder through said inlet port and for expelling the same through said outlet port, of a receiving pipe extending to the inlet port, a discharge pipe extending from the outlet port, and connections permitting a reversal of said pipes with relation to said ports, said connections comprising a pair of cross-pipes connecting said receiving and discharge pipes, a valve in each cross pipe, a valve in the receiving pipe between the cross-pipes, and a valve in the discharge pipe between the cross-pipes.

In testimony whereof I affix my signature in the presence of two witnesses.

JOHN B. BENDER.

Witnesses:
JOHN J. KEIL,
GEO. E. KIRK.

---

Copies of this patent may be obtained for five cents each, by addressing the "Commissioner of Patents, Washington, D. C."